United States Patent [19]
Baker

[11] 3,976,282
[45] Aug. 24, 1976

[54] PLANT ROOT EXTRACTION TOOL

[76] Inventor: Lester H. Baker, 8221 E. Garfield, Apt. L-104, Scottsdale, Ariz. 85257

[22] Filed: Sept. 15, 1975

[21] Appl. No.: 613,261

[52] U.S. Cl. ............................................. 254/132
[51] Int. Cl.² ........................................... B66F 3/00
[58] Field of Search ................. 254/132, 131.5, 131, 254/130, 129, 30

[56] References Cited
UNITED STATES PATENTS

| | | | |
|---|---|---|---|
| 2,504,746 | 4/1950 | Stecker et al. | 254/132 |
| 2,569,242 | 9/1951 | Kors | 254/131 |
| 2,843,359 | 7/1958 | Franz et al. | 254/132 |
| 2,907,106 | 10/1959 | Lockwood | 254/131 |
| 3,029,502 | 4/1962 | Middaugh | 254/129 |
| 3,761,058 | 9/1973 | Stone et al. | 254/94 |

FOREIGN PATENTS OR APPLICATIONS

| | | | |
|---|---|---|---|
| 746,380 | 11/1966 | Canada | 254/131 |
| 76,496 | 9/1961 | France | 254/131.5 |
| 1,007,273 | 10/1965 | United Kingdom | 254/131.5 |

*Primary Examiner*—Al Lawrence Smith
*Assistant Examiner*—Robert C. Watson
*Attorney, Agent, or Firm*—Warren F. B. Lindsley

[57] ABSTRACT

A plant root extraction tool for hand or foot soil penetrating use employing a dual purpose moveable positionable rocking member forming a hand or foot pressure surface for forcing the tool into the ground and then a fulcrum for providing a curved surface for rocking the tool to cause its soil penetrating blade to lift or cut the root of an associated plant.

10 Claims, 6 Drawing Figures

U.S. Patent  Aug. 24, 1976  3,976,282
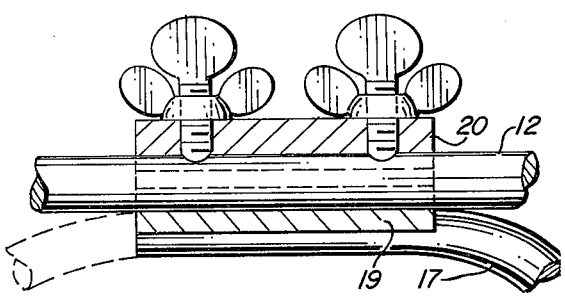
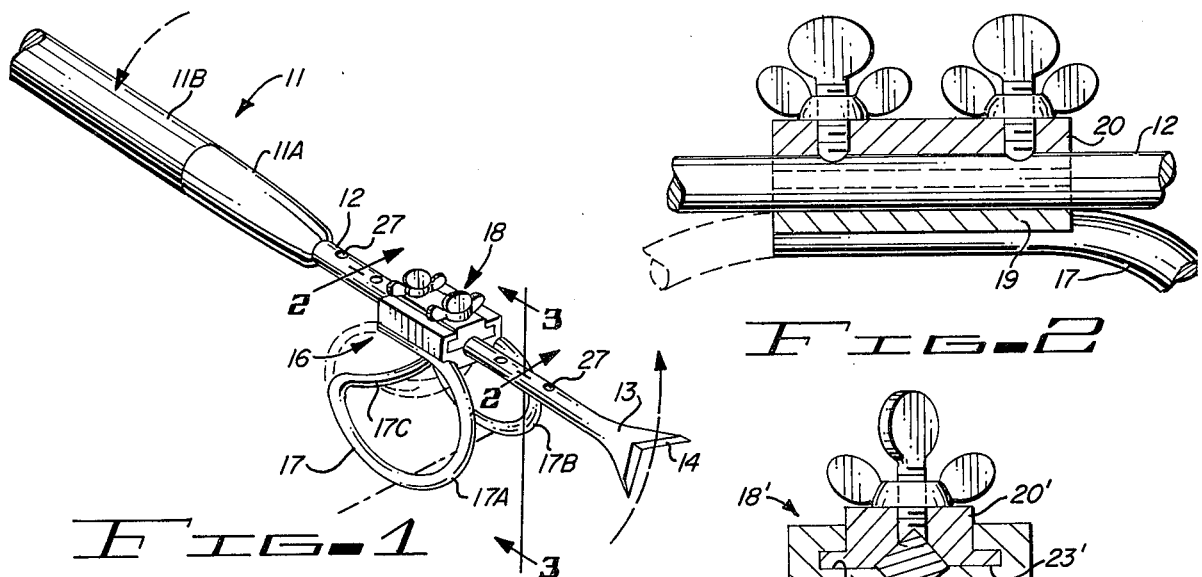
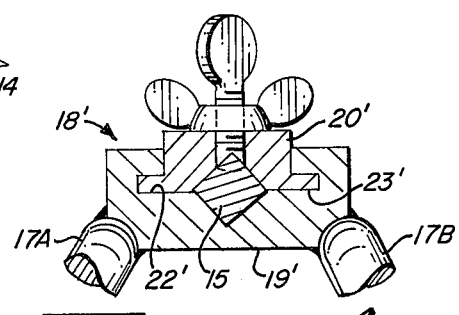
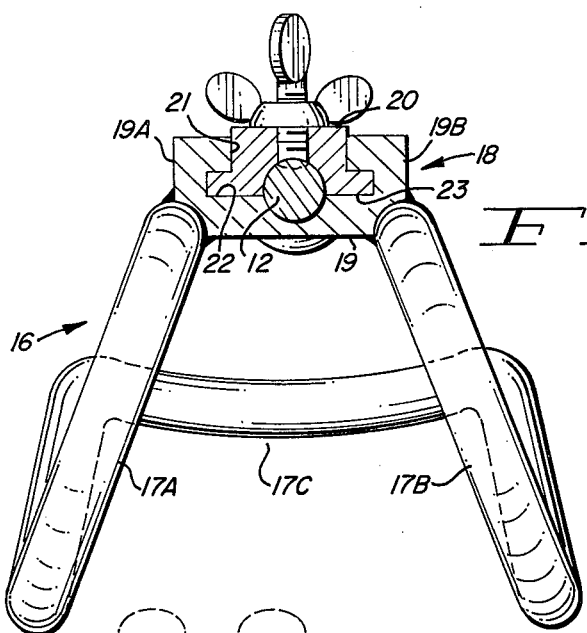
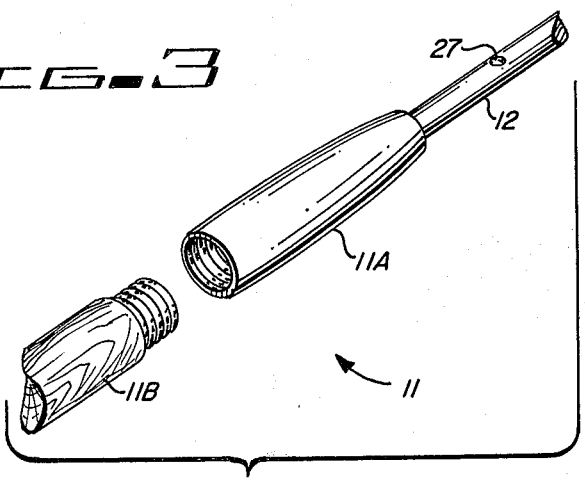
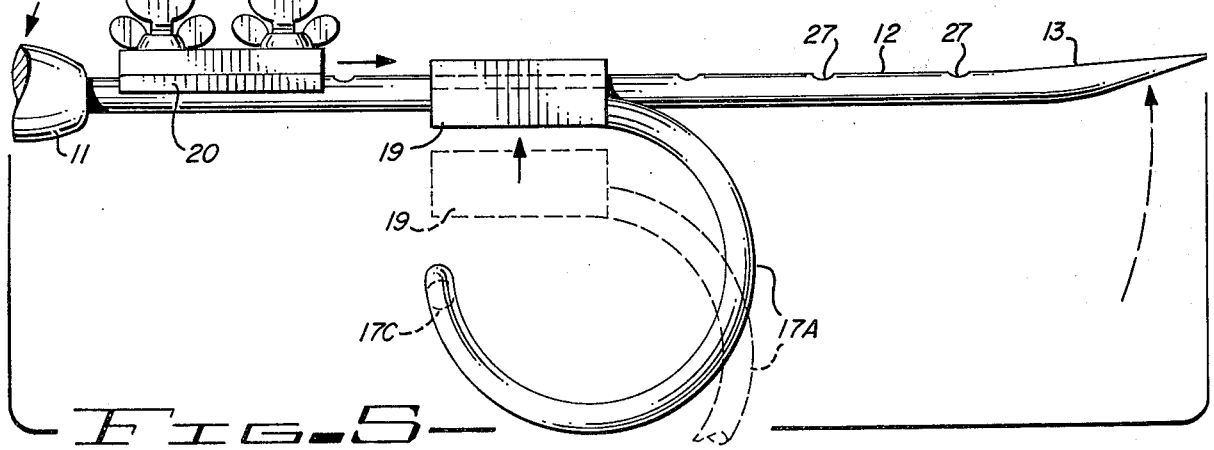

PLANT ROOT EXTRACTION TOOL

BACKGROUND OF THE INVENTION

This invention relates to improvements in farming and gardening implements or tools and more particularly to a hand or foot actuated device for the extraction of plants and their appended roots from the ground.

FIELD OF THE INVENTION

This invention is particularly directed to a plant root extraction tool for hand or foot soil penetrating use employing a dual purpose moveable positionable rocking member forming a hand or foot pressure surface for forcing the tool into the ground and then a fulcrum for providing a curved surface for rocking the tool to cause its soil penetrating blade to lift or cut the root of a plant.

DESCRIPTION OF THE PRIOR ART

Many types of weeders have been provided such as the weeder disclosed in U.S. Pat. No. 1,131,714 granted Mar. 16, 1915 which discloses a hand operated tool employing a fixed fulcrum point for penetrating relatively soft soil. There is no provision in this patent for moveably positioning the fulcrum point or to use the rocker surface serving as the fulcrum point as a hand or foot pressure point for aiding in penetrating the soil.

U.S. Pat. Nos. 1,857,500; 2,420,944 and 3,608,644 also disclose various forms of weed pullers some of which employ a surface serving as a fulcrum point but none of which are readily moveable and also serve as a hand or foot pressure surface.

Accordingly, a need exists for a more practical plant root extraction tool.

SUMMARY OF THE INVENTION

It is, therefore, one object of this invention to provide an improved plant root extraction tool which is applicable for hand or foot soil penetrating use employing a dual purpose moveable positionable rocking member forming a hand or foot pressure surface for forcing the tool into the ground and then a fulcrum for providing a curved surface for rocking the tool to cause its soil penetrating blade to lift or cut the root of an associated plant.

Another object of this invention is to provide an improved hand or foot actuated soil penetrating device which may be slid into the earth along the side of the roots of a plant, rotated a bit about a fulcrum forming a part thereof to lift the pointed end of its blade to lift and remove the root of the plant from the ground.

A further object of this invention is to provide an improved plant extraction tool which is of simple and sturdy construction, is readily and economically fabricated and assembled on a mass production basis and can be marketed as a complete unit or as an attachment to an existing plant root extractor.

A still further object of this invention is to provide an improved plant root extractor which is adjustable for soil penetrating objects.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a plant root extraction tool embodying the invention;

FIG. 2 is a cross-sectional view of FIG. 1 taken along the line 2—2;

FIG. 3 is a cross-sectional view of FIG. 1 taken along the line 3—3;

FIG. 4 is a cross-sectional view of a modification of the fulcrum mounting means shown in FIGS. 1–3;

FIG. 5 is an exploded view of the plant root extraction tool shown in FIG. 1 illustrating how the fulcrum means is assembled on the root extraction blade; and FIG. 6 is an exploded partial view of the handle assembly of the plant root extraction tool shown in FIG. 1 illustrating how the handle is assembled.

DESCRIPTION OF THE PREFERRED EMBODIMENT

Referring more particularly to the drawing by characters of reference, FIGS. 1–3, 5 and 6 illustrate a plant root extraction tool 10 comprising a handle 11 which may be formed of any suitable material such as wood or plastic mounted on an elongated metallic shank 12 of any suitable cross sectional configuration affixed within the end thereof in any suitable manner known in the art. The shank 12 terminates in an integral flat blade 13 having the conventional V-notched cutting blade 14, the edges of which may be sharpened.

Shank 12, as shown in FIGS. 1–3, is of a round or circular configuration but may be of any other suitable cross-sectional configuration such as the square cross-sectional configuration of shaft 15 shown in FIG. 4, as a modification thereof.

The tool comprises a fulcrum means 16 which is moveably mountable along shaft 12 at one of a plurality of positions and comprises a rocker member 17 formed from suitable material such as a metallic rod curved to form a fulcrum. The rocker member comprises two spaced apart curved tangs or portions 17A and 17B interconnected at common ends by a bight portion 17C and secured such as by welding to a shaft clamping means 18 at their other common ends. As noted from the drawings bight 17C may be curved to form a saddle so that a hand or foot applied to this pressure surface may be easily retained therein and kept from slipping off of the tool.

The clamping means 18 comprises a pair of cooperating interlocking sleeves 19 and 20 arranged to slidingly engage and clamp shaft 12 therebetween. The outer sleeve 19 is formed in a generally U-shaped configuration to receive between its turned in legs 19A and 19B the inner sleeve 20 formed in an inverted T-shaped configuration. As obvious from the drawing, sleeve 20 is slid into a channel 21 formed between the legs 19A and 19B of sleeve 19 and locked therein to prevent lateral movement of sleeve 20 relative to sleeve 19.

As noted more clearly from FIG. 3 of the drawing, the engaging surfaces 22 and 23 of sleeves 19 and 20, respectively, are each grooved to cooperatively form in the general configuration of shaft 12 a further groove to receive shaft 12 so that when one or more locking thumbscrews 24 are turned into threaded bores 25 extending through sleeve 20 their ends engage the outer periphery of shaft 12 to force it into tight fitting engagement with sleeve 19, in a well known manner.

To aid in interlocking the clamping means 18 to shaft 12 a plurality of indentations 27 are arranged along its length for positioning the locking means at one of a plurality of points along the length of shaft 12.

As noted from the drawing a wing nut 28 may be threadedly positioned along the shaft by thumbscrews 24 to aid in locking the thumbscrew in its tightened down position. If so desired, bight 17C of the fulcrum means 16 may be provided with a brace 17' extending from the bight to sleeve 19 of the clamping means 18.

FIG. 4 illustrates that a modified clamping means 18' employing sleeves 19' and 20° may be grooved to form between their engaging surface 22' and 23' a square or rectangular configuration for receiving shaft 15 in the manner of shaft 12 heretofore described.

FIG. 5 illustrates in an exploded view how the parts of the clamping means 18 are assembled.

FIG. 6 illustrates that handle 11 may comprise two parts 11A and 11B which threadedly engage so that the tool may be used in its shortened configuration with hand pressure only or as a foot actuated tool in the known manner with the handle extension 11B attached to portion 11A.

As further shown in dash lines in FIGS. 1 and 2, the tangs or portions 17A and 17B may be each formed in a closed arcuate configuration such as, for example, an oval shape which forms a rocking surface for the tool. These modified tangs are interconnected by the bight portion 17C in the same manner as shown in full lines in FIG. 1 for providing foot or hand pressure for the tool to force it into the ground and as a further means for keeping the tangs separated in the desired spread configuration at the rocking base of the fulcrum. This modified structure provides a greater measure of strength to the fulcrum portion of the tool and further simplifies the economics of manufacture. As shown the tangs may be welded or bronzed to the sleeve 19 in the same manner as the full line open ended tangs shown in FIG. 1.

Thus, an improved dual purpose plant root extraction tool is provided having a straight handle encompassing a straight bar or rod, the root extracting end thereof flattened or flaired out into a V-shape and having sharpened edges within the V-shape configuration. The tool convertible into short and long handle models employs a rocking member forming a hand or foot pressure surface for forcing the tool into the ground and then a fulcrum for providing a curved surface for rocking the tool to cause its soil penetrating blade to lift or cut the root of an associated plant.

The tool is inserted into the soil until the V-shaped end comes in contact with the plant's root and then its fulcrum is pried downward against the earth and rocked thereabout to either sever the root or extract it therefrom.

Although but two embodiments of the invention have been shown and described, it will be apparent to those skilled in the art that various changes and modifications may be made therein without departing from the spirit of the invention or from the scope of the appended claims.

What is claimed is:

1. A plant root extraction tool comprising:

a handle portion, a shank portion comprising a circular cross sectional configuration having a root extraction end, sleeve means adapted to fit upon the shank portion for clampingly engaging therewith, and a fulcrum means fastened to said sleeve comprising a pair of tangs having substantially cylindrical cross sectional configurations mounted one on each side of said shank and bent backward upon themselves toward said sleeve in an arcuate configuration to form rocking surfaces for said tool, the arcuate configuration of said tangs being interconnected at common ends by a bight portion for forming a surface for applying pressure to said tool to force it into the ground.

2. The plant root extraction tool set forth in claim 1 wherein:

said bight portion is provided with an indentation for receiving a hand or foot of the user for applying pressure to the tool to force it into the ground.

3. The plant root extraction tool set forth in claim 1 wherein:

said sleeve means comprises a pair of cooperating interlocking parts for clampingly engaging said shaft selectivley at one of a plurality of points along its length.

4. The plant root extraction tool set forth in claim 3 wherein:

said parts of said sleeve means comprise a first generally U-shaped channel member defining a T-shaped groove, and a T-shaped second member for slidingly engaging with said first member in said T-shaped groove.

5. The plant root extraction tool set forth in claim 4 wherein:

cooperating engaging surfaces of said first and second members of said sleeve means define cooperating grooves adaptable for receiving between them said shaft.

6. The plant root extraction tool set forth in claim 5 wherein:

said sleeve means is provided with at least one thumbscrew extending through one of said members for engaging said shaft for tightly holding it in said sleeve means.

7. The plant root extraction tool set forth in claim 6 wherein:

the cross-sectional configuration of said shaft is circular.

8. The plant root extraction tool set forth in claim 6 wherein:

the cross-sectional configuration of said shaft is square.

9. The plant root extraction tool set forth in claim 1 wherein:

each of said tangs comprise a closed arcuate configuration, and said bight portion extends laterally therebetween.

10. The plant root extraction tool set forth in claim 1 wherein:

each of said tangs comprise a closed oval arcuate configuration, and said bight portion extends laterally therebetween.

* * * * *